(12) United States Patent
McKay et al.

(10) Patent No.: US 9,777,613 B2
(45) Date of Patent: Oct. 3, 2017

(54) REGULATION OF A DIESEL EXHAUST AFTER-TREATMENT SYSTEM VIA EXHAUST ENERGY DETERMINATION

(71) Applicant: GM GLOBAL TECHNOLOGY OPERATIONS LLC, Detroit, MI (US)

(72) Inventors: Kevin J McKay, New Hudson, MI (US); Igor Anilovich, Walled Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 143 days.

(21) Appl. No.: 14/854,178

(22) Filed: Sep. 15, 2015

(65) Prior Publication Data

US 2017/0074187 A1  Mar. 16, 2017

(51) Int. Cl.

| | |
|---|---|
| *F01N 11/00* | (2006.01) |
| *F02D 41/02* | (2006.01) |
| *F02D 41/14* | (2006.01) |
| *F02D 41/22* | (2006.01) |
| *F01N 3/10* | (2006.01) |
| *F01N 3/20* | (2006.01) |
| *F01N 9/00* | (2006.01) |
| *F01N 3/021* | (2006.01) |

(52) U.S. Cl.
CPC ............. *F01N 11/00* (2013.01); *F01N 3/021* (2013.01); *F01N 3/106* (2013.01); *F01N 3/2066* (2013.01); *F01N 9/00* (2013.01); *F02D 41/0255* (2013.01); *F02D 41/1445* (2013.01); *F02D 41/1446* (2013.01); *F02D 41/222* (2013.01); *F01N 2430/00* (2013.01); *F01N 2900/1404* (2013.01); *F01N 2900/1411* (2013.01); *F01N 2900/1631* (2013.01); *F02D 2200/0614* (2013.01)

(58) Field of Classification Search
CPC .......... F01N 11/00; F01N 3/021; F01N 3/106; F01N 3/2066; F01N 9/00; F01N 2430/00; F01N 2900/1404; F01N 2900/1411; F01N 2900/1631; F02D 41/024; F02D 41/0255; F02D 41/1445; F02D 41/1446; F02D 41/222; F02D 2200/0614
See application file for complete search history.

(56) References Cited

U.S. PATENT DOCUMENTS 5,729,971 A * 3/1998 Matsuno .................. F01N 9/005
                                                              60/276
8,820,051 B2 * 9/2014 Barasa .................. F01N 3/0253
                                                              60/274

* cited by examiner

*Primary Examiner* — Mark Laurenzi
*Assistant Examiner* — Brandon Lee
(74) *Attorney, Agent, or Firm* — Quinn IP Law

(57) ABSTRACT

A method is disclosed for regulating an exhaust after-treatment (AT) system for a diesel engine. The method includes detecting the engine's cold start when the engine's exhaust gas flow directed into the AT system is at a temperature below a threshold value. The method also includes determining flow-rates of the engine's exhaust gas and its fuel supply. The method additionally includes determining a magnitude of exhaust gas energy using the determined exhaust gas flow-rates and the fuel supply over an elapsed time following the cold start. The method also includes integrating a detected temperature of the exhaust gas over the elapsed time and comparing the determined magnitude of exhaust gas energy with the integrated temperature. Furthermore, the method includes regulating operation of the AT system using the determined exhaust gas temperature when the determined magnitude of exhaust gas energy is within a predetermined value of the integrated exhaust gas temperature.

20 Claims, 3 Drawing Sheets

REGULATION OF A DIESEL EXHAUST AFTER-TREATMENT SYSTEM VIA EXHAUST ENERGY DETERMINATION

TECHNICAL FIELD

The present disclosure is drawn to a system and a method for regulating an exhaust after-treatment (AT) in a diesel engine using an exhaust energy determination.

BACKGROUND

Various exhaust after-treatment devices have been developed to effectively limit exhaust emissions from internal combustion engines. An after-treatment system for a modern diesel engine exhaust typically incorporates a diesel oxidation catalyst (DOC), a selective catalytic reduction (SCR) catalyst, and a diesel particulate filter (DPF).

The DOC is primary responsible for reduction of carbon monoxides (CO) and non-methane hydrocarbons (NMHC), and can also be employed to generate nitrogen dioxide ($NO_2$), which is required by the SCR that is arranged downstream of the DOC. The SCR is configured to convert $NO_x$ into diatomic nitrogen ($N_2$) and water ($H_2O$) with the aid of the $NO_2$ generated by the DOC. The DPF primarily takes care of collecting and disposing sooty particulate matter (PM) emitted by the diesel engine prior to the exhaust gas being discharged to the atmosphere.

A typical after-treatment system also includes a number of sub-systems designed to enhance operation of the after-treatment devices, along with multiple temperature probes for sensing exhaust gas temperature at various locations within the subject system. Accurate assessment of exhaust gas temperature data is essential for precise control of the engine in general, and the AT system in particular.

SUMMARY

A method is disclosed for regulating an exhaust after-treatment (AT) system in fluid communication with a diesel engine. The method includes detecting an occurrence of a cold start of the diesel engine, wherein the engine generates a flow of exhaust gas directed via an exhaust system into the AT system at a temperature below an exhaust gas temperature threshold. The method also includes determining a flow-rate of the exhaust gas and determining a flow-rate of fuel supplied to the engine. The method additionally includes determining a magnitude of exhaust gas energy using the determined flow-rate of the exhaust gas and the determined flow-rate of fuel supplied to the engine over an elapsed time following the cold start of the engine. The method also includes determining and communicating to a controller, via a temperature probe, a temperature of the exhaust gas, and integrating, via the controller, the determined and communicated temperature of the exhaust gas over the elapsed time. The method additionally includes comparing, via the controller, the determined magnitude of exhaust gas energy with the integrated temperature of the exhaust gas. Furthermore, the method includes regulating operation of the AT system using the determined temperature of the exhaust gas when the determined magnitude of exhaust gas energy is within a predetermined value of the integrated temperature of the exhaust gas.

According to the method, the controller can store the detected exhaust gas temperature during the cold start. The method may also include regulating a fueling rate of the engine when the determined magnitude of exhaust gas energy is within the predetermined value of the integrated temperature of the exhaust gas.

The method may additionally include regulating operation of the AT system using a predetermined default value for temperature of the exhaust gas when the determined magnitude of exhaust gas energy is outside the predetermined value of the integrated temperature of the exhaust gas. Specific predetermined default values for the temperature of the exhaust gas can be determined via a data table or an algorithm programmed into the controller for regulating operation of the AT system.

The method may additionally include setting a signal indicative of the temperature probe having malfunctioned when the determined magnitude of exhaust gas energy is outside the predetermined value of the integrated temperature of the exhaust gas. The signal indicative of the temperature probe having malfunctioned can be one of a malfunction indicator light (MIL) and an electronic code configured to be retrieved by an authorized access.

The act of determining the flow-rate of the exhaust gas may be accomplished via communicating, by a gas flow sensor to the controller, a detected flow-rate of the exhaust gas. Alternatively, the act of determining the flow-rate of the exhaust gas may be accomplished via accessing an algorithm or a data table programmed into the controller itself. Determination of the magnitude of exhaust gas energy may be accomplished using values of the determined flow-rate of the exhaust gas that are greater than a minimum exhaust gas flow-rate threshold.

Determination of the flow-rate of fuel supplied to the engine may be accomplished based on engine operation programmed into the controller. Additionally, determination of the magnitude of exhaust gas energy may be accomplished by using values of the determined flow-rate of fuel supplied to the engine that are greater than a minimum fuel flow-rate threshold.

Integrating the determined and communicated temperature of the exhaust gas may exclude an amount of time when the values of the detected flow-rate of the exhaust gas are less than the minimum exhaust gas flow-rate threshold. Additionally, integrating the determined and communicated temperature of the exhaust gas may exclude an amount of time when the values of the flow-rate of fuel supplied to the engine are less than the minimum fuel flow-rate threshold.

According to the disclosure, the predetermined value can be in a range of 500-1000 degrees Celsius-seconds.

A system for regulating a diesel engine AT system and a vehicle employing such a system are also provided.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
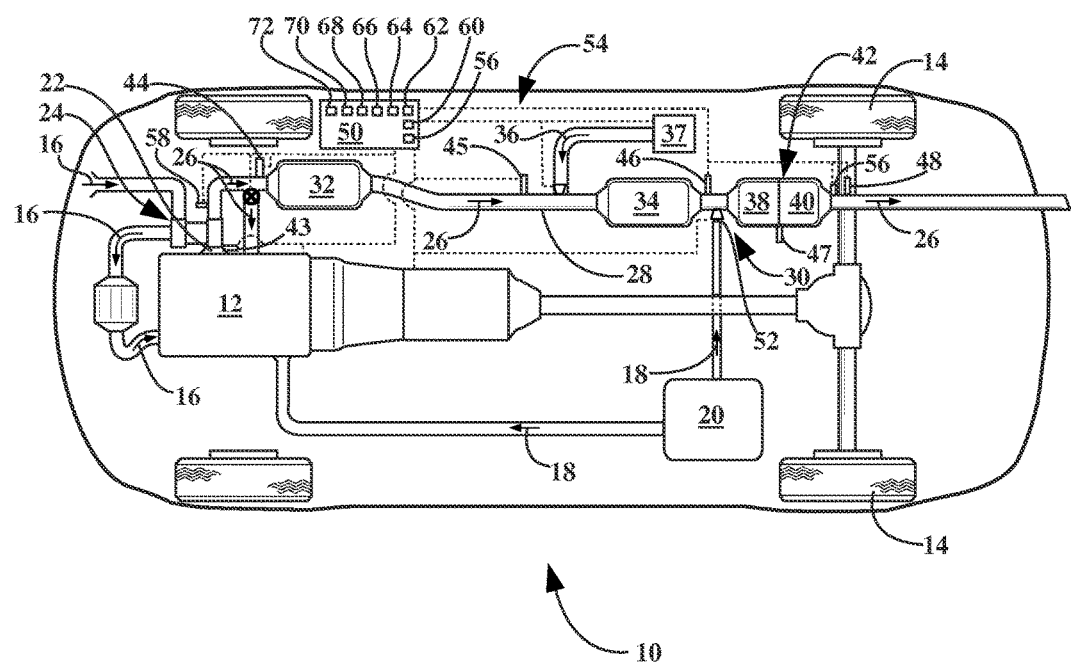
FIG. 1 is a schematic plan view of a vehicle having a diesel engine connected to an exhaust system having an after-treatment (AT) system for reducing exhaust emissions, including a diesel particulate filter (DPF), a particulate matter (PM) sensor, and a number of EGT sensors.

Referring to the drawings, wherein like reference numbers refer to like components throughout the several views, FIG. 1 schematically depicts a motor vehicle 10. The vehicle 10 includes a compression-ignition or diesel internal combustion engine 12 configured to propel the vehicle via driven wheels 14. Internal combustion in the diesel engine 12 occurs when a specific amount of ambient air flow 16 is mixed with a metered amount of fuel 18 supplied from a fuel tank 20 and the resultant air-fuel mixture is compressed inside the engine's cylinders (not shown).

As shown, the engine 12 includes an exhaust manifold 22 and a turbocharger 24. The turbocharger 24 is energized by an exhaust gas flow 26 that is released by individual cylinders of the engine 12 through the exhaust manifold 22 following each combustion event. The turbocharger 24 is connected to an exhaust system 28 that receives a flow of exhaust gas or exhaust gas flow 26 and eventually releases the exhaust gas flow to the ambient, typically on a side or aft of the vehicle 10. Although the engine 12 is depicted as having the exhaust manifold 22 attached to the engine structure, the engine may include exhaust passages (not shown) such as generally formed in exhaust manifolds. In such a case, the above passages may be incorporated into the engine structure, such as the engine's cylinder head(s). Furthermore, although the turbocharger 24 is shown, nothing precludes the engine 12 from being configured and operated without such a power augmentation device.

The vehicle 10 also includes a diesel engine after-treatment (AT) system 30. The AT system 30 includes a number of exhaust after-treatment devices configured to methodically remove particulate matter (PM) or soot, i.e., largely carbonaceous byproducts and emission constituents of engine combustion, from the exhaust gas flow 26. As shown, the AT system 30 operates as part of the exhaust system 28, and includes a diesel oxidation catalyst (DOC) 32. The primary function of the DOC 32 is reduction of carbon monoxide (CO) and non-methane hydrocarbons (NMHC). Additionally, the DOC 32 is configured to generate nitrogen dioxide ($NO_2$), which is required by a selective catalytic reduction (SCR) catalyst 34 that is arranged downstream of the DOC 32. The DOC 32 typically contains a catalyst substance made up of precious metals, such as platinum and/or palladium, which function therein to accomplish the above-noted objectives. Generally, with respect to generation of $NO_2$, the DOC 32 becomes activated and reaches operating efficiency at elevated temperatures. Therefore, as shown in FIG. 1, the DOC 32 may be close-coupled to the turbocharger 24 in order to reduce loss of thermal energy from the exhaust gas flow 26 prior to the gas reaching the DOC.

The SCR catalyst 34, on the other hand, is configured to convert NOx into diatomic nitrogen ($N_2$) and water ($H_2O$) with the aid of the $NO_2$ generated by the DOC 32. The SCR conversion process additionally requires a controlled or metered amount of a reductant having a general name of "diesel-exhaust-fluid" (DEF) 36 when the reductant is employed in diesel engines. The DEF 36 may be an aqueous solution of urea that includes water and ammonia ($NH_3$). The DEF 36 is injected into the exhaust gas flow 26 from a reservoir 37 at a location in the AT system 30 that is downstream of the DOC 32 and upstream of the SCR catalyst 34. Accordingly, the DEF 36 accesses the SCR catalyst 34 as the exhaust gas flow 26 flows through the SCR catalyst. An inner surface of the SCR catalyst 34 includes a wash coat that serves to attract the DEF 36 such that the DEF may interact with the exhaust gas flow 26 in the presence of NO and $NO_2$, and generate a chemical reaction to reduce NOx emissions from the engine 12.

After the SCR catalyst 34, the exhaust gas flow 26 proceeds to a second diesel oxidation catalyst (DOC) 38 arranged in tandem with and upstream of a diesel particulate filter (DPF) 40. The DOC 38 and DPF 40 may be housed inside a single canister 42, as shown in FIG. 1. The DOC 38 is configured to oxidize hydrocarbons and carbon monoxide present in the exhaust gas flow 26 into carbon dioxide ($CO_2$) and water. The DPF 40 is configured to collect and dispose of the particulate matter emitted by the engine 12 prior to the exhaust gas flow 26 being discharged to the atmosphere. Accordingly, the DPF 40 acts as a trap for removing the particulate matter, specifically, soot, from the exhaust gas flow 26. Similar to the DOC 32 described above, each of the DOC 38 and the DPF 40 typically contains precious metals, such as platinum and/or palladium, which function as catalysts in the subject devices to accomplish their respective objectives. After passing through the DOC 38 and DPF 40 inside the canister 42, the exhaust gas flow 26 is deemed to be sufficiently cleaned of the noxious particulate matter and may then be allowed to exit the exhaust system 28 to the atmosphere.

Figure 2:
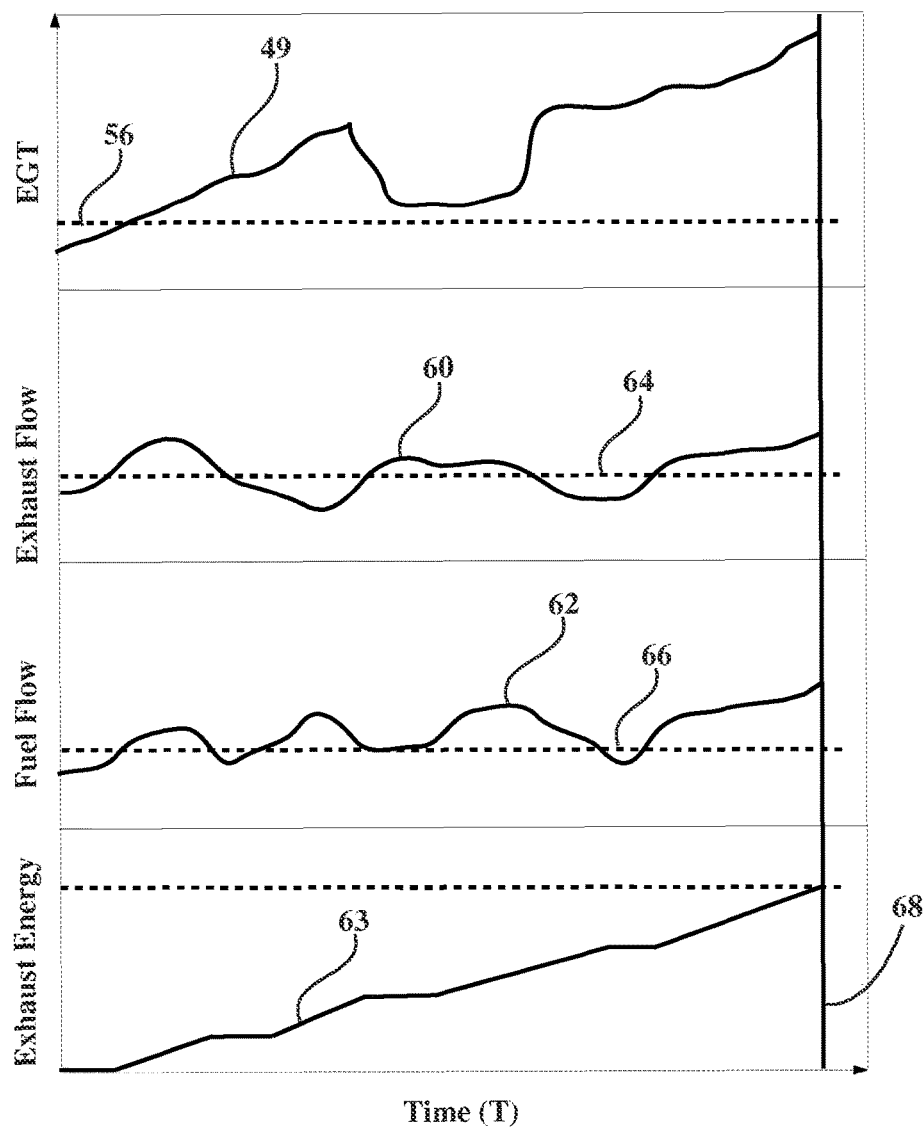
FIG. 2 is an illustration of representative data for exhaust gas temperature, exhaust flow-rate, and fuel flow-rate, along with corresponding calculated exhaust energy, each plotted against elapsed time during warm up of the diesel engine shown in FIG. 1.

The AT system 30 may also include a number of temperature probes or exhaust gas temperature (EGT) sensors, 43, 44, 45, 46, 47, and 48 configured to detect temperature 49 of the exhaust gas flow 26 at various points downstream of the engine 12. As shown in FIG. 1, the EGT sensor 43 is positioned between the engine 12, specifically the engine's cylinders, and the turbocharger 24 to thereby detect temperature 49 of the exhaust gas flow 26 following its discharge from the cylinders. The EGT sensor 44 is positioned upstream of the DOC 32 and is thus configured to detect temperature 49 of the exhaust gas flow 26 entering the DOC 32, following its discharge from the turbocharger 24. The EGT sensor 45 is positioned between the DOC 32 and the SCR catalyst 34, thus being configured to detect temperature 49 of the exhaust gas flow 26 entering the SCR catalyst. The EGT sensor 46 is positioned downstream of the SCR catalyst 34 but upstream of the DOC 38, thus being configured to detect temperature 49 of the exhaust gas flow 26 entering the DOC 38. The EGT sensor 47 is positioned between the DOC 38 and the DPF 40 in order to detect temperature 49 of the exhaust gas flow 26 in that location. The EGT sensor 48 is positioned downstream of the DPF 40 in order to detect temperature 49 (as shown in FIG. 2) of the exhaust gas flow 26 following its discharge from the DPF.

Although temperature of the exhaust flow 26 is generally represented by numeral 49, as is understood by those skilled in the art, actual value of exhaust gas temperature will be distinct at every individual location along the path of the exhaust gas flow 26, as detected by the respective EGT sensor 43, 44, 45, 46, 47, and 48. Additionally, although specific temperature probes or EGT sensors, 43, 44, 45, 46, 47, and 48 are shown, nothing precludes the engine 12 and its attendant AT system 30 from having additional or fewer EGT sensors depending on the need to detect temperature 49 of the exhaust gas flow 26 at specific locations between the engine's cylinders and where the exhaust gas is released into the ambient.

The AT system also 30 includes a controller 50. According to the disclosure, the controller 50 is configured to regulate operation of the engine 12, as well as operation of the exhaust after-treatment devices, namely the DOC 32, SCR catalyst 34, DOC 38, and DPF 40. Each of the EGT sensors 43, 44, 45, 46, 47, and 48 is in electrical communication with the controller 50 in order to facilitate regulation of the AT system 30. The controller 50 may be configured as a central processing unit (CPU) configured to regulate operation of an internal combustion engine 12 (shown in FIG. 1), a hybrid-electric powertrain (not shown), or other alternative types of powerplants, as well as other vehicle systems, or a dedicated controller. In order to appropriately control operation of the AT system 30, the controller 50 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 50 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 50 may also include a floppy disk, a flexible disk, hard disk, magnetic tape, any other magnetic medium, a CD-ROM, DVD, any other optical medium, etc. The controller 50 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 50 or accessible thereby may be stored in the memory and automatically executed to provide the required functionality.

During operation of the engine 12, hydrocarbons emitted by the engine 12 may at times become deposited on the DPF 40 and consequently affect operating efficiency of the AT system 30. Accordingly, the DPF 40 must be regenerated or cleaned after some particular amount of carbon-based soot is accumulated thereon to burn off the collected particulates. Regeneration of an exhaust after-treatment device may, for example, be commenced after a specific mass flow of air has been consumed by the engine for combustion over a period of time. Generally, such regeneration may be accomplished using high temperature exhaust gas flow to burn off the accumulated particles. The DPF 40 may be regenerated via fuel 18 being injected directly into the exhaust gas flow upstream of the DPF and then having the injected fuel ignited at an appropriate instance. Over time, degradation of the DPF 40 structure may lead to excessive soot leaking past the device.

The AT system 30 additionally includes a specific device such as an HC injector 52 configured to selectively inject a predetermined amount of diesel fuel 18 into the exhaust gas flow 26 following the SCR catalyst 34 and upstream of the DOC 38. Such injection of the diesel fuel 18 is employed to superheat the exhaust gas flow and perform regeneration of the AT system 30, and specifically of the DPF 40. The controller 50 may regulate operation of the HC injector 52 to commence or trigger regeneration of the AT system 30, e.g., via transmission of appropriate control signals, when such is deemed appropriate.

The vehicle 10 also includes a system 54 having the exhaust system 28, the EGT sensors, 43-48, and the controller 50. The system 54 is configured to regulate operation of the engine 12, such as by controlling an amount of fuel 18 supplied from the fuel tank 20 for combustion inside the engine's cylinders based on the temperatures of the exhaust gas flow 26 detected by any of the EGT sensors, 43-48. Similarly, the system 54 may also regulate operation of the AT system 30 based on the temperatures of the exhaust gas flow 26 detected by any of the EGT sensors, 43-48, such as by determining the most advantageous time to inject the DEF 36 into the exhaust gas flow 26 to facilitate the SCR conversion process.

As part of operation of the system 54, the controller 50 is configured to detect an occurrence of a cold start of the engine. Specifically, a cold start of the engine 12 is defined as an engine start when the temperature 49 of exhaust gas flow 26 directed via an exhaust system 28 into the AT system 30, i.e., released from the cylinders, is below an exhaust gas temperature threshold 56 (shown in FIGS. 1-2). The temperature 49 of exhaust gas flow 26 released from the cylinders, as detected by the EGT sensor 43, will typically be below the exhaust gas temperature threshold 56 approximately 6 hours following cessation of previous engine operation, i.e., after a directly preceding "engine on" condition. The controller 50 may store the exhaust gas temperature 49 detected during the cold start by each of the EGT sensors 43-48.

As shown in FIG. 1, a gas flow sensor 58 can be arranged upstream of the DOC 32 and configured to detect a flow-rate 60 of the exhaust gas and communicate the detected flow-rate to the controller 50. Accordingly, the controller 50 is configured to determine the flow-rate 60 of the exhaust gas, such as via receiving a signal from the gas flow sensor 58 indicative of the detected flow-rate or via accessing an algorithm or a data table programmed into the controller itself. The controller 50 is additionally configured to determine a flow-rate 62 of fuel 18 supplied to the engine, such as via fuel injectors (not shown) provided specifically for each individual cylinder. Accordingly, because the controller 50 regulates operation of the engine 12, the controller can also determine the flow-rate of fuel 18 supplied to the engine 12 based on engine operation programmed into the controller.

The controller 50 is also configured to determine a magnitude of exhaust gas energy 63, such as via a programmed algorithm, using the determined exhaust gas flow-rate 60 and the determined fuel flow-rate 62 over an elapsed amount of time T following the cold start of the engine 12. The controller 50 may include an internal timer (not shown) configured to assess how much time has elapsed since the cold start. In order to eliminate the effect of any elapsed time attributable to engine operation that does not markedly contribute to an increase in exhaust gas energy 63, the controller 50 can use values of the determined exhaust gas flow-rates that are greater than a minimum exhaust gas flow-rate threshold 64. For the same reason, the controller 50 can be configured to use values of the determined flow-rate of fuel 18 supplied to the engine 12 that are greater than a minimum fuel flow-rate threshold 64. As such, the controller 50 can be configured to exclude an amount of time when the values of the determined flow-rate 60 of the exhaust gas are less than the minimum exhaust gas flow-rate threshold 64 and an amount of time when the values of fuel flow-rate supplied to the engine 12 are less than the minimum fuel flow-rate threshold 66 to integrate the received temperature 49 values of the exhaust gas flow 26. Effectively, the exhaust flow energy counter in the controller 50 is frozen when the engine 12 operates below the thresholds 64 and 66.

The controller 50 is additionally configured to receive from any of the temperature probes or EGT sensors 43-48 signal(s) indicative of the detected temperature 49 of the exhaust gas flow 26. The controller 50 is also configured to mathematically integrate the received temperature 49 values of the exhaust gas over the elapsed time T. The controller 50 is additionally configured to compare the determined magnitude of exhaust gas energy 63 with the integrated temperature of the exhaust gas. The controller 50 can then use the detected temperature 49 of the exhaust gas flow 26 to regulate operation of the AT system 30 and/or the fueling rate of the engine 12 when the determined magnitude of exhaust gas energy 63 is within a predetermined value 68 (shown in FIG. 2) of the integrated temperature of the exhaust gas. For robustness of operation of the system 54, the predetermined value 68 can be in a range of 500-1000 degrees Celsius-seconds. Therefore, the system 54 can identify when the EGT sensor 43-48 signal diverges from a realistic temperature value for that sensor based on the comparison of the exhaust gas integrated temperature as detected by the specific EGT sensor with the determined magnitude of exhaust gas energy 63.

In the event that the determined magnitude of exhaust gas energy 63 is outside the predetermined value 68 of the integrated temperature of the exhaust gas flow 26, the controller 50 can use a predetermined default value for temperature of the exhaust gas flow to regulate operation of the AT system 30 or the engine 12 in general. Control of the engine 12 via the predetermined default value for temperature of the exhaust gas flow 26 may, for example, include regulating the rate of fuel 18 supplied to the cylinders. A specific predetermined default value for temperature of the exhaust gas flow 26 can be determined via a mathematical algorithm or a data table, each programmed into the controller 50 and generally identified by numeral 70 in FIG. 1. The subject data table can be organized to cross-reference each specific default value of exhaust gas flow 26 temperature versus particular operation of the engine 12. Reference data for the subject data table can be compiled empirically during testing and validation of the engine 12 in general, and the AT system 30 in particular. Such reference data can also serve as real-world verification of the output from the mathematical algorithm.

As shown in FIG. 1, the controller 50 may be additionally configured to set a signal 72 indicative of any of the EGT sensors 43-48 having malfunctioned or having failed, when the determined magnitude of exhaust gas energy 63 is outside the predetermined value 68 of the integrated temperature of the exhaust gas. The above assessment is generally indicative of the particular EGT sensor 43-48 generating erroneous signals. Typically, such an erroneous signal from an EGT is particularly difficult to discern when the sensor's signal is within a plausible temperature range for the specific operating conditions of the engine 12. The signal 72 may be generated via a malfunction indicator lamp (MIL) and/or an electronic trouble code embedded in the memory of the controller 50 for subsequent retrieval by an authorized entity. The signal 72 identifying that the EGT sensor 43-48 is malfunctioning or has failed can be set by the controller 50 while the engine 12 is active during a warmup stage of engine operation, i.e., typically when the EGT is continually increasing in a range of ambient to 300 degrees Celsius, and which usually takes place during 100 seconds after the cold start. Rate of warmup of the engine 12 typically depends on ambient conditions, primarily on the temperature and engine loading which can all be monitored by the controller 50 via appropriate sensors, such as for ambient temperature and amount of fuel used by the engine over a particular duration of time.

Figure 3:
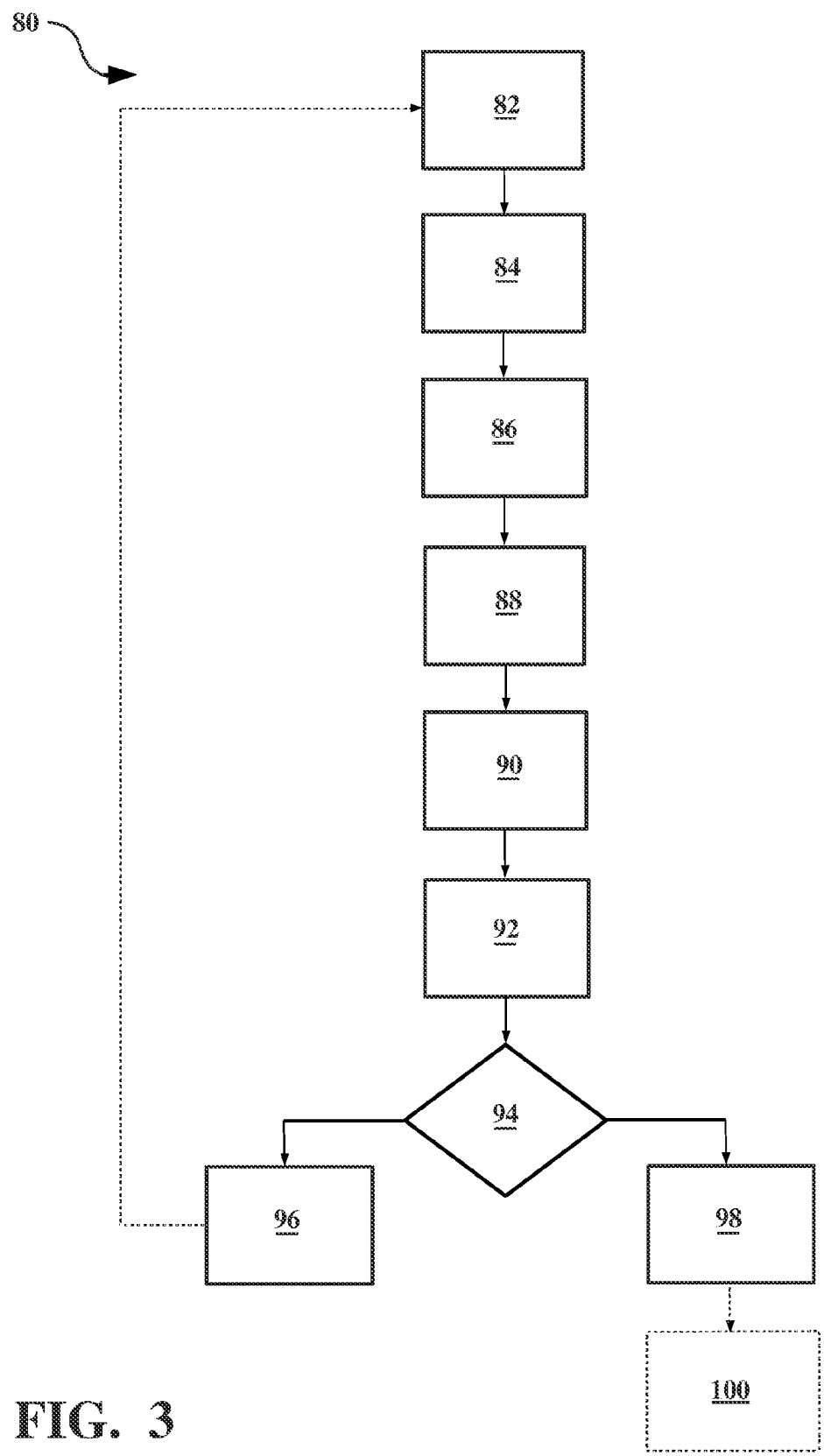
FIG. 3 is a flow diagram of a method of regulating the AT system shown in FIG. 1.

FIG. 3 depicts a method 80 of regulating the AT system 30 for the diesel engine 12, as described above with respect to FIGS. 1-2. The method initiates in frame 82, where it includes detecting, via the controller 50, an occurrence of a cold start of the engine 12. As described with respect to FIGS. 1-2 above, during cold start, the engine 12 generates exhaust gas flow 26 directed via the exhaust system 28 into the AT system 30 at a temperature below the exhaust gas temperature threshold 56. The controller 50 can also store the detected exhaust gas temperature during the engine cold start. After frame 82, the method advances to frame 84 where the method includes determining a flow-rate 60 of the exhaust gas. Following frame 84, the method proceeds to frame 86 where the method includes determining a flow-rate 62 of fuel 18 supplied to the engine 12.

After frame 86, the method advances to frame 88 and includes determining a magnitude of exhaust gas energy 63 using the determined flow-rate 60 of the exhaust gas and the determined flow-rate 62 of fuel supplied to the engine 12 over an elapsed amount of time T following the cold start of the engine. Following frame 88, the method proceeds to frame 90 where it includes determining and communicating to the controller 50 via any of the temperature probes or EGT sensors 43-48 a respective temperature 49 of the exhaust gas flow 26. After frame 90, the method advances to frame 92 and includes integrating, via the controller 50, the determined and communicated temperature 49 of the exhaust gas flow 26 over the elapsed time T.

Following frame 92, in frame 94 the method includes comparing, via the controller 50, the determined magnitude of exhaust gas energy 63 with the integrated temperature of the exhaust gas flow 26. If in frame 94 the controller 50 determines that the determined magnitude of exhaust gas energy 63 is within the predetermined value 68 of the integrated temperature of the exhaust gas flow 26, the method advances to frame 96. In frame 96 the controller 50 uses the determined temperature 49 of the exhaust gas flow 26 detected by the respective EGT sensor 43-48 to regulate operation of the AT system 30 and/or the engine 12. Following the frame 96, the method may loop back to frame 82.

When, on the other hand, in frame 94, the controller 50 determines that the determined magnitude of exhaust gas energy 63 is outside the predetermined value 68 of the integrated temperature of the exhaust gas flow 26, the method advances to frame 98. In frame 98 the controller 50 uses the predetermined default value for temperature of the exhaust gas flow 26, whether in the data table or algorithm, each identified via the numeral 70 in FIG. 1, to regulate operation of the AT system 30 and/or the engine 12. Following the frame 98, the method may proceed to frame 100 where the method includes setting the signal 72 indicative of any of the EGT sensors 43-48 having malfunctioned or failed. As described above with respect to the FIGS. 1-2, the signal 72 may be either a malfunction indicator light (MIL) or an electronic code configured to be retrieved by authorized access to the controller 50.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of regulating an exhaust after-treatment (AT) system in fluid communication with a diesel engine, the method comprising:
    detecting, via a controller, a cold start of the diesel engine, wherein the engine generates a flow of exhaust gas directed via an exhaust system into the AT system at a temperature below an exhaust gas temperature threshold;
    determining, via the controller, a flow-rate of the exhaust gas;
    determining, via the controller, a flow-rate of fuel supplied to the engine;
    determining, via the controller, a magnitude of exhaust gas energy using the determined flow-rate of the exhaust gas and the determined flow-rate of fuel supplied to the engine over an elapsed time following the cold start of the engine;
    determining and communicating to the controller via a temperature probe a temperature of the exhaust gas;
    integrating, via the controller, the determined and communicated temperature of the exhaust gas over the elapsed time;
    comparing, via the controller, the determined magnitude of exhaust gas energy with the integrated temperature of the exhaust gas; and
    regulating, via the controller, operation of the AT system using the determined temperature of the exhaust gas when the determined magnitude of exhaust gas energy is within a predetermined value of the integrated temperature of the exhaust gas.

2. The method of claim 1, further comprising regulating, via the controller, operation of the AT system using a predetermined default value for temperature of the exhaust gas when the determined magnitude of exhaust gas energy is outside the predetermined value of the integrated temperature of the exhaust gas.

3. The method of claim 2, further comprising setting a signal indicative of the temperature probe having malfunctioned when the determined magnitude of exhaust gas energy is outside the predetermined value of the integrated temperature of the exhaust gas, wherein the signal indicative of the temperature probe having malfunctioned is one of a malfunction indicator light (MIL) and an electronic code configured to be retrieved by an authorized access.

4. The method of claim 1, wherein said determining the flow-rate of the exhaust gas is accomplished via communicating, by a gas flow sensor to the controller, a detected flow-rate of the exhaust gas, or via accessing an algorithm or a data table programmed into the controller, and wherein said determining the magnitude of exhaust gas energy is accomplished by using values of the determined flow-rate of the exhaust gas that are greater than a minimum exhaust gas flow-rate threshold.

5. The method of claim 4, wherein said determining the flow-rate of fuel supplied to the engine is accomplished based on engine operation programmed into the controller, and wherein said determining the magnitude of exhaust gas energy is accomplished by using values of the determined flow-rate of fuel supplied to the engine that are greater than a minimum fuel flow-rate threshold.

6. The method of claim 5, wherein said integrating the determined and communicated temperature of the exhaust gas excludes an amount of time when the values of the determined flow-rate of the exhaust gas are less than the minimum exhaust gas flow-rate threshold and an amount of time when the values of the flow-rate of fuel supplied to the engine are less than the minimum fuel flow-rate threshold.

7. The method of claim 1, wherein the predetermined value is in a range of 500-1000 degrees Celsius-seconds.

8. A system for regulating an exhaust after-treatment (AT) system in fluid communication with a diesel engine, the system comprising:
    an exhaust system directing a flow of exhaust gas generated by the diesel engine into the AT system;
    a temperature probe configured to detect a temperature of the exhaust gas generated by the diesel engine and communicate a signal indicative of the detected temperature; and
    a controller configured to:
        detect a cold start of the engine, wherein the engine generates a flow of exhaust gas directed via the exhaust system into the AT system at a temperature below an exhaust gas temperature threshold;
        determine a flow-rate of the exhaust gas;
        determine a flow-rate of fuel supplied to the engine;
        determine a magnitude of exhaust gas energy using the determined flow-rate of the exhaust gas and the determined flow-rate of fuel supplied to the engine over an elapsed time following the cold start of the engine;
        receive from the temperature probe a signal indicative of the detected temperature of the exhaust gas;
        integrate the received temperature of the exhaust gas over the elapsed time;
        compare the determined magnitude of exhaust gas energy with the integrated temperature of the exhaust gas; and
        regulate operation of the AT system using the determined temperature of the exhaust gas when the determined magnitude of exhaust gas energy is within a predetermined value of the integrated temperature of the exhaust gas.

9. The system of claim 8, wherein the controller is additionally configured to regulate operation of the AT system using a predetermined default value for temperature of the exhaust gas when the determined magnitude of exhaust gas energy is outside the predetermined value of the integrated temperature of the exhaust gas.

10. The system of claim 9, wherein the controller is additionally configured to set a signal indicative of the temperature probe having malfunctioned when the determined magnitude of exhaust gas energy is outside the predetermined value of the integrated temperature of the exhaust gas, wherein the signal indicative of the temperature probe having malfunctioned is one of a malfunction indicator light (MIL) and an electronic code configured to be retrieved by an authorized access.

11. The system of claim 8, further comprising a gas flow sensor configured to detect the flow-rate of the exhaust gas and communicate the flow-rate of the exhaust gas to the controller, and wherein the controller is configured to use values of the detected flow-rate of the exhaust gas that are greater than a minimum exhaust gas flow-rate threshold.

12. The system of claim 11, wherein the controller is configured to determine the flow-rate of fuel supplied to the engine based on engine operation programmed into the controller, and wherein the controller is configured to use values of the determined flow-rate of fuel supplied to the engine that are greater than a minimum fuel flow-rate threshold.

13. The system of claim 12, wherein the controller is configured to exclude an amount of time when the values of the detected flow-rate of the exhaust gas are less than the minimum exhaust gas flow-rate threshold and an amount of time when the values of the flow-rate of fuel supplied to the engine are less than the minimum fuel flow-rate threshold to integrate the received temperature of the exhaust gas.

14. The system of claim 8, wherein the predetermined value is in a range of 500-1000 degrees Celsius-seconds.

15. A vehicle comprising:
a diesel engine configured to propel the vehicle;
an after-treatment (AT) system in fluid communication with the diesel engine;
an exhaust system directing a flow of exhaust gas generated by the diesel engine into the AT system;
a temperature probe configured to detect a temperature of the exhaust gas generated by the diesel engine and communicate a signal indicative of the detected temperature; and
a controller configured to:
detect a cold start of the engine, wherein the engine generates a flow of exhaust gas directed via the exhaust system into the AT system at a temperature below an exhaust gas temperature threshold;
determine a flow-rate of the exhaust gas;
determine a flow-rate of fuel supplied to the engine;
determine a magnitude of exhaust gas energy using the determined flow-rate of the exhaust gas and the determined flow-rate of fuel supplied to the engine over an elapsed time following the cold start of the engine;
receive from the temperature probe a signal indicative of the detected temperature of the exhaust gas;
integrate the received temperature of the exhaust gas over the elapsed time;
compare the determined magnitude of exhaust gas energy with the integrated temperature of the exhaust gas; and
regulate operation of the AT system using the determined temperature of the exhaust gas when the determined magnitude of exhaust gas energy is within a predetermined value of the integrated temperature of the exhaust gas.

16. The vehicle of claim 15, wherein the controller is additionally configured to regulate operation of the AT system using a predetermined default value for temperature of the exhaust gas when the determined magnitude of exhaust gas energy is outside the predetermined value of the integrated temperature of the exhaust gas.

17. The vehicle of claim 16, wherein the controller is additionally configured to set a signal indicative of the temperature probe having malfunctioned when the determined magnitude of exhaust gas energy is outside the predetermined value of the integrated temperature of the exhaust gas, wherein the signal indicative of the temperature probe having malfunctioned is one of a malfunction indicator light (MIL) and an electronic code configured to be retrieved by an authorized access.

18. The vehicle of claim 15, further comprising a gas flow sensor configured to detect the flow-rate of the exhaust gas and communicate the flow-rate of the exhaust gas to the controller, and wherein the controller is configured to use values of the detected flow-rate of the exhaust gas that are greater than a minimum exhaust gas flow-rate threshold.

19. The vehicle of claim 18, wherein the controller is configured to determine the flow-rate of fuel supplied to the engine based on engine operation programmed into the controller, and wherein the controller is configured to use values of the determined flow-rate of fuel supplied to the engine that are greater than a minimum fuel flow-rate threshold.

20. The vehicle of claim 19, wherein the controller is configured to exclude an amount of time when the values of the detected flow-rate of the exhaust gas are less than the minimum exhaust gas flow-rate threshold and an amount of time when the values of the flow-rate of fuel supplied to the engine are less than the minimum fuel flow-rate threshold to integrate the received temperature of the exhaust gas.

* * * * *